United States Patent

Allington

[15] 3,676,686

[45] July 11, 1972

[54] HIGH SENSITIVITY LIGHT ABSORBANCE APPARATUS

[72] Inventor: Robert W. Allington, Lincoln, Nebr.

[73] Assignee: Instrumentation Specialties, Inc., Lincoln, Nebr.

[22] Filed: July 24, 1970

[21] Appl. No.: 58,020

[52] U.S. Cl................................250/206, 307/311, 330/86
[51] Int. Cl..........................................................H01j 39/12
[58] Field of Search..............250/206, 214, 209, 210, 218; 356/201, 180, 181; 307/311; 330/159, 143, 28, 86

[56] References Cited

UNITED STATES PATENTS

| | | | |
|---|---|---|---|
| 3,531,645 | 9/1970 | De Jong | 250/206 X |
| 2,482,980 | 9/1949 | Kallman | 250/210 X |
| 3,463,927 | 8/1969 | Allington | 250/218 X |
| 3,504,603 | 4/1970 | Brzonkala et al. | 250/214 P X |
| 3,363,105 | 1/1968 | Dixon | 250/206 |
| 3,340,427 | 9/1967 | Bisso | 250/210 X |
| 3,214,593 | 10/1965 | Killpatrick | 250/210 |

Primary Examiner—Walter Stolwein
Attorney—Vincent L. Carney

[57] ABSTRACT

An arrangement for measuring very small changes in the absorbance of light within an optical cell by means of a photoresistive photocell, the photocell being connected in a circuit wherein the electrical load impedance presented to the photocell is very small compared to that of the photocell, and including circuitry so that the output voltage is very nearly proportional to the logarithm of the light intensity striking the photocell.

11 Claims, 5 Drawing Figures

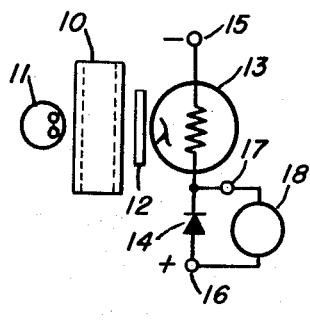
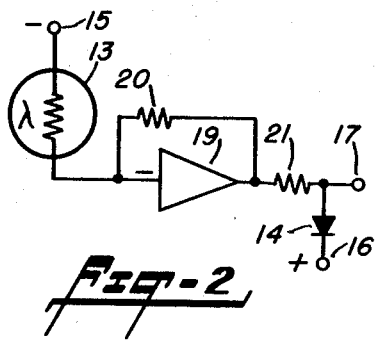
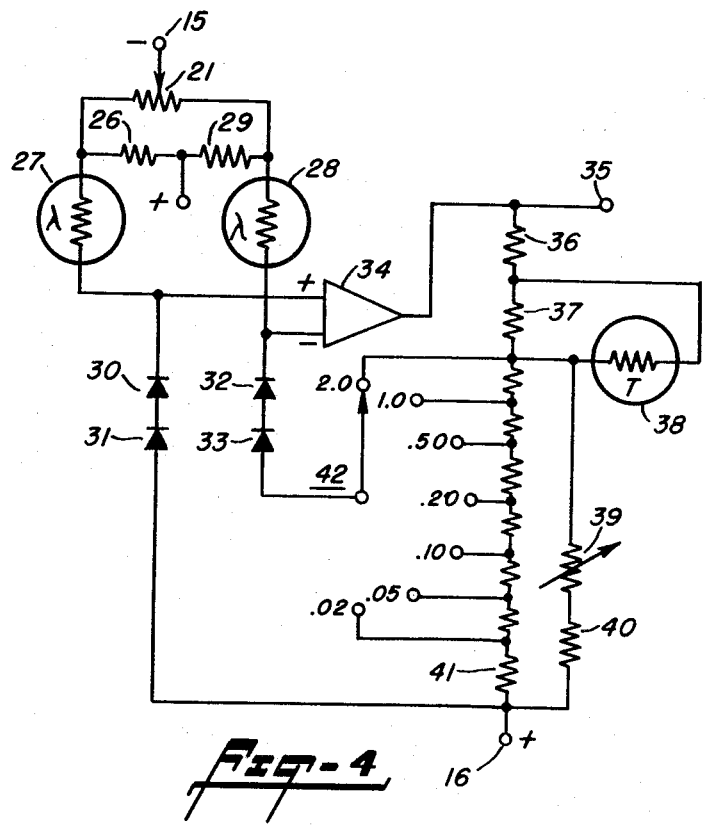
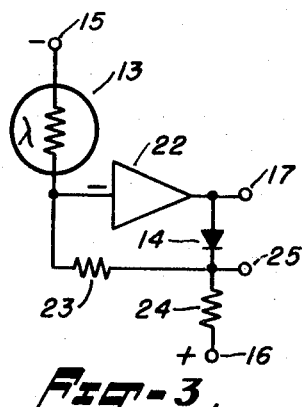
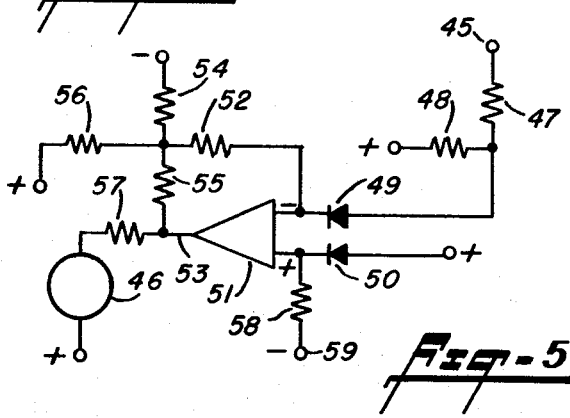
ROBERT W. ALLINGTON
INVENTOR.
ATTORNEYS

HIGH SENSITIVITY LIGHT ABSORBANCE APPARATUS

BACKGROUND OF THE INVENTION

When light measurement for the purpose of measuring very small light absorbances or very small light absorbance differences is made with photoresistive cells, the chief problem limiting the sensitivity of measurement is the electrical noise level and stability of the photoresistive cells. Photoresistive cells are usually used in some form of electrical-bridge circuit. The basic electrical theory relating to obtaining the lowest noise levels in electrical-bridge circuits is to match the impedance of the resistive measuring element of the bridge to the resistance of the element in series with it. When these two resistances are matched, that is, approximately equal, electric circuit theory predicts that the noise level should be at a minimum and that the maximum sensitivity of measurement can be made. An example of a circuit where these resistances are partially matched is shown in my U.S. Pat. No. 3,463,927.

Surprisingly enough, most photoresistive photocells do not exhibit optimum noise and stability performance when they are used in a circuit with roughly comparable series load resistances. The reason for this is due to the fact that most photoresistive cells exhibit a time-dependent voltage coefficient (variation in electrical resistance with applied voltage), as well as their well-known time-dependent light intensity coefficient (variation of resistance with incident light intensity). When such a photoresistive photocell is connected in series with a comparably large resistance, variations in photocell resistance due to light intensity change cause the voltage across the photocell to change appreciably, which in turn causes another appreciable change in the photocell's resistance because of its own voltage coefficient. This second-order change in resistance also effects the voltage impressed across the photocell and results in decreased electrical stability and increased electrical noise level in this type of circuit.

The time-dependence of the light intensity coefficient of resistance also has another undesirable feature when used in a circuit where the resistance of the photocell load resistor is roughly comparable to the photocell resistance. The response speed of the combination to light intensity changes is often slower when the resistance values are roughly comparable than when the load resistor is quite small compared to the photocell resistance. This slower response is the result of the voltage change across the photocell when the light intensity changes, a change in light intensity causing a change in the photocell resistance. This resistance change is not instantaneous but often requires a significant period of time. However, if the voltage across the photocell changes when the resistance of the photocell changes in response to a shift in light intensity level, as it would if the photocell were in series with a large enough load resistance, this voltage change will cause an additional resistance change in the photocell due to the photocell's voltage coefficient of resistance. This second change is also not instantaneous and can require a significant period of time. The circuit does not reach equilibrium until some time later because of the second change in the resistance due to the voltage coefficient of resistance will cause a further change in the photocell voltage which, in turn, will cause a further change in resistance due to the voltage coefficient, and so forth.

In accordance with this invention, a substantially constant voltage is maintained across the photocell by an operational amplifier, thereby eliminating the objectionable increased noise levels and/or slower response characteristic of prior circuits of this type. Such arrangement is particularly adapted for providing an indication in terms of light absorbance in an optical cell, the difference of light absorbance between two optical cells, and the ratio of light transmittance between two optical cells. In the latter case, the measurement of the ratio of percent transmittance is of particular advantage if very wide ranges of light absorbance are encountered and if it is not necessary to obtain an indication directly proportional to the concentration of the material absorbing the light. The factor under measurement, in this arrangement, will not cause the deflecting member of the indicating or recording device to go off scale since infinite absorbance is equal to zero light transmittance, which is a finite value of transmittance.

An object of this invention is the provision of improved apparatus for measuring very small changes in the absorbance of light within an optical cell.

An object of this invention is the provision of an apparatus for measuring the absorbance difference between two optical cells.

An object of this invention is the provision of a circuit providing an output directly proportional to the logarithm of the current flowing through it, which circuit comprises a photoresistive photocell connected to a d.c. voltage in series with a diode and a high impedance measuring circuit responsive to the voltage drop across the diode.

An object of this invention is the provision of an improved arrangement for measuring very small changes in light absorbance within an optical cell, or very small light absorbance differences within two optical cells, by means of photoresistive photocells, which arrangement is not greatly effected by the electrical noise level and stability of the photocells, thereby resulting in a high sensitivity of measurement.

The above-stated and other objects and advantages of the invention will become apparent from the following description when taken with the accompanying drawings. It will be understood, however, that the drawings are for purposes of illustration and are not to be construed as defining the scope or limits of the invention reference being had for the latter purpose of the appended claims.

BRIEF DESCRIPTION OF THE DRAWINGS

In the drawings wherein like reference characters denote like parts in the several views:

FIG. 1 is a circuit diagram of one embodiment of the invention as used for the measurement of light absorbance within an optical cell;

FIGS. 2 and 3 illustrate variations of the circuit for measuring light absorbance within an optical cell;

FIG. 4 is a circuit diagram of another embodiment of this invention useful for the measurement of the difference in light absorbance within two optical cells; and FIG. 5 is a circuit diagram of a circuit which may be added to the circuit of FIG. 4 for the purposes of measuring the ratio of light transmittances.

DESCRIPTION OF PREFERRED EMBODIMENTS

Reference is made to FIG. 1, wherein there is shown an optical flow cell 10 through which a liquid flows for the purpose of measuring the light absorbance thereof. The optical cell is positioned in the path of a light beam emanating from a light source 11, such as a low pressure mercury lamp, which light beam passes through a suitable filter 12 and impinges upon a photoresistance photocell 13. The photocell is connected in series with a diode 14. A d.c. voltage is applied across the terminals 15 and 16 and an electrical output is taken from the terminals 16 and 17 for measurement by the meter 18. In order to obtain good accuracy, the voltage applied across the terminals 15 and 16 is at least 10 times the voltage drop across the diode. For this reason the voltage drop across the photocell does not vary significantly as its resistance varies in response to changes in the light intensity incident upon it. The resistance of the photocell is approximately inversely proportional to the light intensity incident upon it and, therefore, the current flowing through the photocell and diode is approximately directly proportional to the incident light intensity. The voltage drop across the diode is very nearly directly proportional to the logarithm of the light intensity on the photocell.

The circuits shown in FIGS. 2 and 3 also present a load resistance to the photocell that is very small compared to the resistance of the photocell, whereby noise level is decreased, stability is increased and response speed is increased. In FIG.

2, the operational amplifier 19 has its inverting input connected to one end of the photoresistive photocell 13, the other end of the photocell being connected to the negative terminal 15. A resistor 20 is connected between the input and output of the amplifier. Because of the negative feedback produced by the combination of the amplifier and resistor 19, the electrical impedance presented to the photocell is very small and the input voltage of the amplifier is always near zero. An operational amplifier has, by definition, sufficient internal gain so that its input voltage must be near zero in order that its output voltage be within reasonable limits. The voltage across the photocell, therefore, will not change significantly with changes in the photocell resistance. A resistor 21 is connected from the output terminal of the amplifier to the diode 14 and the output terminal 17, the resistance of the resistor 21 being much larger than the effective resistance of the diode so that the current flow through the diode is very nearly proportional to the output voltage of the amplifier. FIG. 3 is a somewhat similar circuit wherein the impedance presented to the photocell is made very small by negative feedback action of the operational amplifier 22 through the feedback resistor 23, the voltage used to develop the negative feedback through the resistor 23 being the voltage drop across the resistor 24 as a result of current flow through the diode 14. The voltage drop across the resistor 24 is directly proportional to the current flowing through the photocell. The current flow through the diode is approximately proportional to the light intensity on the photocell and, therefore, the voltage appearing across the output terminals 17 and 25 is approximately proportional to the logarithm of the light intensity reaching the photocell.

In the circuits of FIGS. 1–3, the voltage change across the diode, used for logarithmic conversion purposes, is approximately 70 millivolts for a ten-to-one change in current flow through the diode. The voltage change sensitivity increases with increasing temperature of the diode. Even more seriously, the voltage across the diode, at constant current flow through the diode, varies significantly with temperature. This variation is approximately a 2 millivolt decrease per degree centigrade increase in temperature. Thus, in a practical application, some provision must be made for temperature compensation so that accurate measurement can be made. In the absence of temperature compensation, temperature fluctuations will add to the apparent noise level and instability of the circuit.

Reference now is made to FIG. 4 wherein the circuit of FIG. 1 is utilized in such a way as to be compensated with respect to temperature changes. The photoresistive photocells 27 and 28 are connected to the negative terminal 15 through a balancing or zero-adjusting network comprising the resistors 21, 26 and 29. Connected in series with the photocells 27 and 28 are the diodes 30 and 31, and the diodes 32 and 33, respectively. These diodes have very close electrical matching with regard to the two effects of temperature mentioned hereinabove and, also, close matching with respect to the logarithmic conversion sensitivity of current into voltage. Two or more diodes may be connected in series with each of the photocells in order to increase the logarithmic conversion sensitivity. For example, if one diode produces a voltage change of 70 millivolts for a 10-to-one change in current flow therethrough, two diodes connected in series will produce 140 millivolts for a 10-to-one change in current. An integrated-circuit diode assembly may conveniently be used for the illustrated diodes as integrated-circuit diodes provide good matching characteristics. An operational amplifier 34 has its inverting input connected between the photocell 28 and the diode 32, and its non-inverting input connected between the photocell 27 and the diode 30. The output of the amplifier is connected to the output terminal and, also, to an adjustable feedback network comprising the fixed resistors 36 and 37, a temperature-sensitive resistor 38 having a negative temperature coefficient of resistance, an adjustable calibrating resistor 39, the fixed resistors 40 and 41, and a range-changing switch 42. It will be apparent that the two photocells and the two pairs of diodes are connected to form a bridge circuit. Assuming the photocells 27 and 28, respectively, constitute the reference and measurement branches of the bridge, the amount of negative feedback supplied to the measurement branch of the bridge depends upon the setting of the switch 42 and upon the setting of the calibrating resistor 39. The resistance inserted into the measurement circuit by the range-changing switch 42 is small compared to the effective resistance of the diodes 32 and 33. As shown, the fixed contacts of the switch 42 have associated therewith markings corresponding to the full scale light absorbance or optical density ranges from 0.02 absorbance to 2.00 absorbance for full-scale voltage output across the output terminals 16 and 35. There is a hundred times more negative feedback to the measurement channel of the bridge circuit when the switch 42 is set at the 2.00 position than when it is set at the 0.02 position. Therefore, a hundred times larger change in the logarithm of the resistance ratios the two photocells is necessary to cause a full-scale voltage output when the switch is set at the 2.00 instead of the 0.02 position. The fine-adjustment resistor 39 is manually set to calibrate the apparatus so that full-scale voltage output across the terminals 16 and 35 corresponds exactly to the desired full-scale range of light absorbance. Precision resistors preferably are used so that calibration for correct full-scale absorbance on one of the ranges selected by means of the switch 42 causes the remainder of the ranges to be automatically and simultaneously calibrated. The voltage at the output terminals 16 and 35 is not affected by the negative 2 millivolts per degree centigrade temperature change of the diodes because the temperature changes of the diodes 30 and 31 produce almost exactly the same voltage change as the diodes 32 and 33. These two changes are subtracted from each other by the amplifier 34, leaving an almost zero difference. Since the sensitivity of the logarithmic conversion produced by the diodes changes with temperature, the temperature sensitive resistor 38, which may be a thermistor, decreases the gain of the negative feedback amplifier circuit at higher temperatures in such a way as to keep the overall light absorbance sensitivity of the system constant with respect to temperature changes. The reference photocell 27 is placed at the end of a reference light path that passes through a reference light-absorbance optical cell, whereas the measurement photocell 28 is placed at the end of a measuring light path passing through an optical cell carrying the liquid under measurement. The two photocells preferably are matched with respect to light sensitivity, color response and temperature coefficient of resistance in order to provide the best circuit performance with respect to accuracy, stability and noise level. Alternatively, the photocell 27 can be replaced by a fixed resistance, in which case the photocell 28 is used only for the purpose of measuring absolute light absorbance instead of differential absorbance.

The circuit of FIG. 2 or FIG. 3 can be incorporated in the circuit of FIG. 4. This will require the use of more than one operational amplifier to produce the performance of the FIG. 4 circuit, but such arrangement may be found to be desirable under some circumstances. For example, complete circuit shown in FIG. 2 can be substituted for the reference photocell 27 and the diodes 30 and 31 of FIG. 4, and the non-inverting input of the amplifier 34 of FIG. 4 is connected to the output terminal 17 of FIG. 2. A second circuit identical to that shown in FIG. 2 is substituted for the measurement photocell 28 and the diodes 32 and 33 of FIG. 4, with the inverting input of the amplifier 34 connected to the similar output terminal 17 of the second circuit and the terminal 16 of the second circuit connected to the common terminal of the switch 24.

Any of the circuits shown in FIGS. 1–3 may be used for the indication and/or recording of absolute light absorbance within an optical cell. In the circuits of FIGS. 1 and 2, a voltmeter and/or voltage recorder is connected across the circuit output terminals 16 and 17, the indicating and/or recording device being generally identified by the reference numeral 18 in FIG. 1. In the circuit of FIG. 3, the indicating and/or recording device would be connected across the output terminals 17 and 25. In either case, the only requirement is that the impedance of the measuring device, which is connected in parallel with the diode, be very high compared to the effective resistance of the particular diode.

For measuring the difference in light absorbance within two optical cells the circuit of FIG. 4 is used, with the indicating and/or recording device connected across the output terminals 16 and 35.

If it is desired to measure the ratio of light transmittances instead of the difference in light absorbances the measuring circuit shown in FIG. 5 is added to the circuit of FIG. 4. The terminal 45 (FIG. 5) is connected to the terminal 35 (FIG. 4) and an indication or recording is made by means of a voltmeter or a voltage recorder generally identified by the numeral 46. The voltage divider resistors 47 and 48 serve to reduce the voltage appearing on the terminal 45 and to apply such reduced voltage to the integrated-circuit, dual diodes 49 and 50. In order to maintain the inputs to the operational amplifier 51 in balance, the output voltage of this amplifier must be such that the current flowing through the feedback resistor 52 balances any current changes in the diode 49 due to voltage changes applied to such diode by the voltage appearing at the junction of the voltage divider resistors 47 and 48. The current flowing through the feedback resistor 52 must flow through the diode 49. The current flow through the resistor 52 is proportional to the output voltage of the amplifier 51 appearing on the lead 53. Since the voltage across the diode 49 is proportional to the logarithm of the current flowing through the diode, the current flowing through such diode must be proportional to the antilogarithm of the voltage at the junction of the voltage divider resistors 47 and 48. Therefore, the voltage appearing on the lead 53 must be proportional to the antilogarithm of the voltage at the terminal 45 and, so, the voltage on the lead 53 must be proportional to the percent transmittance ratio seen by the photocells 27 and 28 of FIG. 4. This is because the voltage on the wire 53 is the antilogarithm of the difference of the logarithms of the current flowing through these photocells. The voltage divider network comprising the resistors 54–56, sets the proper voltage bias levels for accurate operation of the antilogarithmic conversion of the diode 49. By proper selection of these resistance values, an accurate measure of the ratio of percent transmittance may be obtained from the voltage on the lead 53, through the resistor 57, when the range selector switch 42 (FIG. 4) is set to the highest absorbance range, namely 2.0. Bias current through the resistor 58, from the negative supply voltage at the terminal 59, develops a voltage across the diode 50, which voltage varies with temperature in a manner almost identical to the voltage variation of the diode 49 due to variation in temperature. The subtracting operation of the two inputs to the amplifier 51 causes these spurious temperature-induced voltages to be subtracted from each other so that most of the error due to temperature fluctuations is cancelled out.

Photoresistive photocells are, of course, well known. The logarithmic voltage-current characteristic of silicon semi-conductor diodes is also well known. However, when these components are connected and operated in accordance with the several embodiments of this invention, there is a substantial improvement in the signal to noise ratio. This improvement in the signal to noise ratio is not predicted by existing theory. The improvement in response speed also is not predicted by existing theory.

It will be apparent to those skilled in this art that other conventional means than diodes can be used for the purpose of deriving a logarithmically converted signal from the photocells as, for example, the well known logarithmic conversion circuit incorporating a transistor in the feedback path of an operational amplifier.

Having now described the invention what I desire to protect by Letters Patent is set forth in the following claims.

1. Apparatus for measuring light intensity comprising:

photoresistive means for developing a first signal that is substantially proportional to the intensity of light incident upon the photoresistive means;

logarithmic means, electrically connected in circuit with said photoresistive means, for developing a second signal that is substantially proportional to the logarithm of the first signal;

output means adapted to provide said second signal to a utilization unit, whereby said utilization unit receives information concerning said light intensity; and operational amplifier means electrically connected by a linear direct signal path to said photoresistive means and in circuit with said logarithmic means, to provide a load resistance to said photoresistive means that is very small compared to the resistance of said photoresistive means and to control the potential across said photoresistive means and logarithmic means as the resistance of said photoresistive means varies to provide precision, fast response, low noise and stability to said apparatus in supplying said second signal to said output means.

2. Apparatus according to claim 1 in which said operational amplifier means comprises:

an operational amplifier having an operational amplifier input terminal and an operational amplifier output terminal;

said operational amplifier input terminal being electrically connected to said photoresistive means;

said operational amplifier output terminal being electrically connected to said logarithmic means and said output means, whereby said output means receives said second signal;

said operational amplifier means further comprising a feedback path between said operational amplifier output terminal and said operational amplifier input terminal, whereby compensation is provided for the voltage drop across said logarithmic means so that the precision, stability, speed of response and noise characteristics of said apparatus are improved.

3. Apparatus, according to claim 2 in which said logarithmic means is electrically connected to said operational amplifier output terminal through an output impedance element having a greater impedance than said logarithmic means and said output means is electrically connected between the output impedance element and the logarithmic means.

4. Apparatus according to claim 2 in which the logarithmic means is a logarithmic diode.

5. Apparatus according to claim 2 in which said feedback path includes said logarithmic means and a feedback resistance means connected electrically in series.

6. Apparatus according to claim 5 in which: said output means includes an output resistor and an output terminal electrically connected in parallel at a junction between said logarithmic means and said feedback resistance means;

said feedback resistance means having greater resistance than said output resistor, whereby said second signal is developed as a potential across said logarithmic means.

7. Apparatus according to claim 5 in which:

said photoresistive means includes first and second photoresistors, each having different first and second photoresistor terminals;

said first photoresistor terminals of said first and second photoresistors being adapted to be electrically connected to a source of potential;

said operational amplifier having a second operational amplifier input terminal;

the second photoresistor terminal of one of said first and second photoresistors being electrically connected to said first-mentioned operational amplifier input terminal;

the second photoresistor terminal of the other of said first and second photoresistors being electrically connected to said second operational amplifier input terminal;

one of said first-mentioned and second operational amplifier input terminals being an inverting terminal, whereby changes in the potential across one of said first and second photoresistors results in compensating changes in the potential across the other of said first and second photoresistors from the feedback path of said operational amplifier means to stabilize, reduce the noise and increase the speed of response of said apparatus.

8. Apparatus according to claim 7 in which:
said logarithmic means includes a plurality of logarithmic diodes;
at least one of said plurality of logarithmic diodes being electrically connected between said operational amplifier output terminal and said first-mentioned operational amplifier input terminal;
at least one other of said plurality of logarithmic diodes being electrically connected to said second operational amplifier input terminal;
said output means being electrically connected to said operational amplifier output terminal, whereby a bridge is formed for comparing the resistances of said first and second photoresistors and for balancing the changes in said one and one other of said plurality of logarithmic diodes that occur due to temperature changes and for balancing the changes in potential across the one and one other of said plurality of logarithmic diodes that occur because of changes in the resistances of the photoresistors so as to improve the precision with which the apparatus operates.

9. Apparatus according to claim 8 in which said feedback resistance means includes at least one variable resistor connected electrically in series with one of said one and one other of said plurality of logarithmic diodes, whereby the response of said apparatus may be adjusted.

10. Apparatus according to claim 8 in which at least two of said plurality of logarithmic diodes are electrically connected between said operational amplifier output terminal and said first-mentioned operational amplifier input terminal and at least two different diodes of said plurality of logarithmic diodes are electrically connected between said operational amplifier output terminal and said second operational amplifier input terminal.

11. Apparatus according to claim 8 further including means for developing the anti-logarithm of the second signal and for providing an output voltage which varies in correspondence with the ratio of the percent transmittances with respect to the intensity of the light reaching said first and second photoresistors.

* * * * *